United States Patent [19]

Hansen

[11] Patent Number: 4,550,783
[45] Date of Patent: Nov. 5, 1985

[54] SELF-PROPELLED AERATING DEVICE

[75] Inventor: Loren F. Hansen, Lincoln, Nebr.

[73] Assignee: Outboard Marine Corporation, Waukegan, Ill.

[21] Appl. No.: 123,277

[22] Filed: Feb. 21, 1980

Related U.S. Application Data

[63] Continuation of Ser. No. 874,209, Feb. 1, 1978, abandoned.

[51] Int. Cl.$^4$ ............................................. A01B 45/02
[52] U.S. Cl. ........................................... 172/21; 74/875
[58] Field of Search ...................... 172/21, 22, 42, 43; 74/872–876

[56] References Cited

U.S. PATENT DOCUMENTS

| 2,387,236 | 10/1945 | Cousino | 74/876 X |
| 2,587,343 | 2/1952 | Lind | 74/874 X |
| 2,611,279 | 9/1953 | Bergsten et al. | 74/874 |
| 2,645,947 | 7/1953 | Lendved et al. | 74/874 |
| 2,808,733 | 10/1957 | Fageol | 74/876 |
| 2,835,182 | 5/1958 | Smithburn | 172/43 |
| 2,864,298 | 12/1958 | Pearson, Jr. | 172/21 X |
| 3,134,269 | 5/1964 | Shimanckas | 74/876 |
| 3,272,030 | 9/1966 | Blozis | 74/875 |
| 3,375,740 | 4/1968 | Bottum | 74/872 |

Primary Examiner—Paul E. Shapiro
Attorney, Agent, or Firm—Michael, Best & Friedrich

[57] ABSTRACT

A self-propelled aerator including a chassis having a handle, an aerator rotor, and an engine having an idle speed. A throttle operatively connected with the engine is movable between a normally idle position for operating the engine at the idle speed and an advanced position for operating the engine at above the idle speed. An aerator drive is movable between a normally disengaged position rendering the aerating rotor inoperative and an engaged position drivingly connecting the aerating rotor with the engine. A control mechanism moves the aerator drive from the disengaged position to the engaged position before moving the throttle from the idle position to the advanced position and moves the throttle from the advanced position to the idle position before moving the aerator drive from the engaged position to the disengaged position. The aerating rotor is mounted on the rear end portion of chassis for rotation relative thereto, and the handle is attached to the rear end portion. The chassis is adapted to pivot relative to a front support when the handle is moved vertically upwardly, thereby lifting the aerating rotor off the ground. A rear support is mounted on the rear end portion of the chassis and is movable between a transport position, in which it supports the aerating rotor from the ground, and an operational position in which the rotor supports the rear end portion from the ground and the rear support limits the depth of penetration of the rotor into the ground.

9 Claims, 5 Drawing Figures

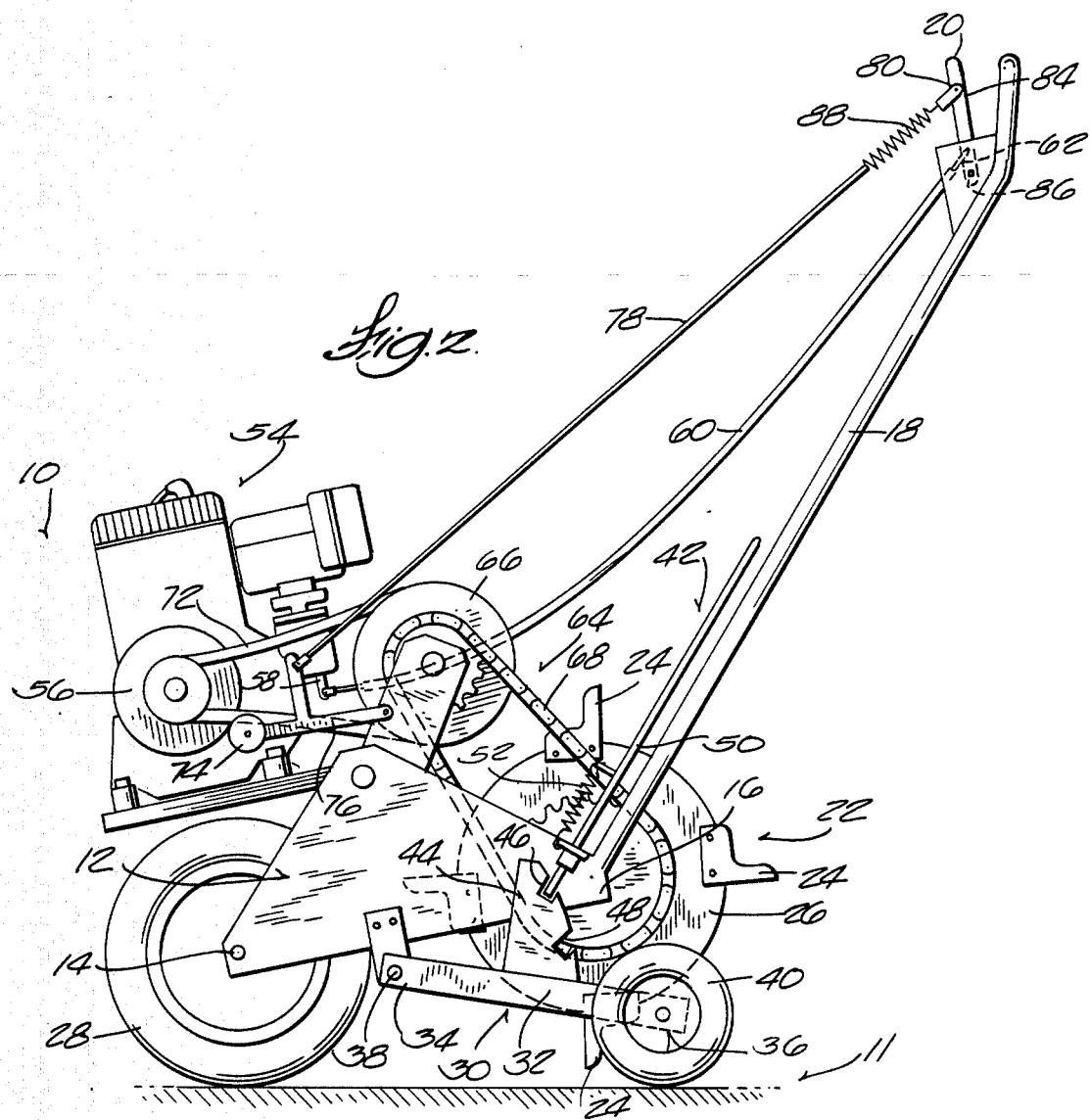

SELF-PROPELLED AERATING DEVICE

This is a continuation of application Ser. No. 874,209, filed Feb. 1, 1978, now abandoned.

BACKGROUND OF THE INVENTION

The invention relates generally to aerating devices, and more particularly, to self-propelled aerating devices.

Aerating devices which mechanically aerate lawn and soil areas are known. Representative prior art constructions of aerating devices are disclosed in the following United States Patents:

| Smith | 21,377 | August 31, 1858 |
| Harvey | 208,088 | September 17, 1878 |
| Marcy | 1,704,986 | March 12, 1929 |
| Stidger | 1,742,563 | January 7, 1930 |
| Hamshaw | 1,878,442 | September 20, 1932 |
| Archibald | 2,056,337 | October 6, 1936 |
| Krenzke | 2,258,061 | October 7, 1941 |
| Clark | 2,450,749 | October 5, 1948 |
| Howard | 2,545,735 | March 20, 1951 |
| De Cato | 2,664,683 | June 5, 1954 |
| Howard | 2,792,900 | May 21, 1957 |
| Hall | 2,816,496 | December 17, 1957 |
| Marlow | 2,961,055 | November 22, 1960 |

To facilitate operation, an aerating device commonly includes a small reciprocating engine which drives the aerating assembly and propels the device over the ground. As with other powered devices, it is desirable to coordinate the operation of the engine throttle with the operation of the clutch assembly, which engages and disengages the aerating assembly, to provide smooth and reliable performance. It is also desirable to be able to control the depth of penetration of the aerating assembly into the ground and achieve overall lateral stability in the device when the aerating assembly is being operated, while facilitating the transportation of the device when the aerating assembly is not in operation.

None of the above patents discloses a simple yet effective means for coordinating the operation of the engine throttle and clutch assembly in a self-propelled aerator. While some of the above patents disclose means to control the depth of penetration of the aerating assembly into the ground (Stidger, Hamshaw, Archibald, and Howard), as well as means to facilitate the transportation of the device when the aerating assembly is not in operation (Marcy), none discloses a self-propelled aerating device that achieves both of these results with a minimum of operator effort.

SUMMARY OF THE INVENTION

The invention provides a self-propelled aerating device including a chassis having a handle, aerating means for penetrating the ground, an engine having an idle speed, and a throttle operatively connected with the engine and movable between a normally idle position for operating the engine at the idle speed and an advanced position for operating the engine above the idle speed. The device further includes aerator drive means which is movable between a normally disengaged position for rendering the aerating means inoperative and an engaged position for drivingly connecting the aerating means with the engine, and control means for moving the aerator drive means from the disengaged position to the engaged position before moving the throttle from the idle position to the advanced position and for moving the throttle from the advanced position to the idle position before moving the aerator driving means from the engaged position to the disengaged position.

In accordance with one embodiment, the control means includes a throttle control cable operatively connected with the throttle, an aerator control cable operatively connected with the aerator drive means, and a control handle attached to the handle and operatively connected with the throttle control cable and the aerator control cable. The control handle is movable between a neutral position holding the throttle in the idle position and the aerator drive means in the disengaged position, and a drive position holding the throttle in the advanced position and the aerator drive means in the engaged position. The control handle further includes an intermediate position between the neutral and drive positions, the control handle having an aerator cable aperture adapted to engage the aerator control cable to move the aerator drive means from the disengaged to the engaged position in response to movement of the control handle from the neutral to the intermediate position, and a throttle cable aperture adapted to slidably receive the throttle control cable when the control handle is moved from the neutral to the intermediate position and to engage the throttle control cable to move the throttle from the idle position to the advanced position in response to movement of the control handle from the intermediate to the drive position.

In accordance with another embodiment of the invention, the control handle includes an override bracket operatively connected with the throttle control cable and spring means attached to the override bracket. The override bracket is adapted to move the throttle from the idle position to the advanced position in response to movement of the control handle from the neutral to the drive position and to move the throttle from the advanced position to the idle position in response to the spring means. In this embodiment, the override bracket includes tab means for preventing movement of the override bracket in response to the spring means in excess of the movement of the control handle between the drive position and the neutral position.

In accordance with another embodiment of the invention, the engine includes a drive wheel. The aerator drive means includes a flywheel drivingly connected with the aerating means and a flexible drive belt carried by the flywheel and the drive wheel. In this embodiment, the drive belt has a loosely-carried position corresponding to the disengaged position of the aerator drive means, and a tightly-carried position corresponding to the engaged position of the aerator drive means. Belt tightening means is provided for adjusting the flexible drive belt between the loosely-carried position and the tightly-carried position in response to movement of the control handle. The belt tightening means includes a pulley carried by the flexible drive belt intermediate the drive wheel and the flywheel and a lever arm pivotally connected to the pulley for moving the pulley against the flexible drive belt to increase the tension thereof, which lever arm is operable in response to the control handle.

In accordance with another embodiment of the invention, the chassis includes a front end portion and a rear end portion. Front support means is mounted on the front end portion for rotation relative to the front end portion and supports the front end portion off the ground. In this embodiment, the aerating means is mounted on the rear end portion for rotation relative to the rear end portion, and the handle is also attached to the rear end portion. The chassis is adapted to pivot relative to the front support means when the handle is moved vertically upwardly, thereby lifting the aerating means off the ground. Rear support means is provided, being mounted for pivotal movement relative to the rear end portion and being movable between a transport position, in which the rear support means supports the rear end portion and the aerating means from the ground, and an operational position in which the aerating means supports the rear end portion from the ground and the rear support means limits the depth of penetration of the aerating means into the ground to a predetermined depth.

In accordance with this embodiment, the rear support means includes a shaft having opposed ends and being mounted transversely across the chassis for rotation relative to the chassis with each of the opposed ends being located outwardly of the aerating means. A pair of support frames are provided, each having an inner end and an outer end and each of the inner ends are mounted upon each of the opposed ends for rotation therewith. A support wheel is mounted on each of the outer ends for rotational movement relative to each of the outer ends, which support wheels hold the rear end portion and aerating means from the ground when the rear support means is in the transport position and limit the depth of penetration of the aerating means to a predetermined depth when the rear support means is in the operational position.

Also in accordance with this embodiment, the rear support means includes locking means for selectively holding the pair of support frames in either the transport position or the operational position, which locking means is movable between a normally locked position to prevent pivotal movement of the pair of support frames, and an unlocked position to allow pivotal movement of the pair of support frames between the transport and the operational positions. The locking means is manually operable between the locked and unlocked positions.

One of the principal features of the invention is the provision of a self-propelled aerating device which includes control means for coordinating the respective positions of the throttle and the aerator drive means through the use of a single control handle.

Another of the principal features of the invention is the provision of a self-propelled aerating device which includes override means for reducing the possibility that the throttle may become stuck or frozen in the advanced position as the aerator drive means is moved from the engaged to disengaged position, while at the same time permitting rapid disengagement of the aerator drive means in the event that the throttle does become frozen in the advanced position.

Still another of the principal features of the invention is the provision of a self-propelled aerating device which includes rear support means movable between an operational position to control the depth of penetration of the aerating means into the ground when the aerating means is in operation, and a transport position in which the rear support means supports the rear end portion and the aerating means for the ground to facilitate movement of the device when the aerating means is not in operation.

Other features and advantages of the embodiment of the invention will become apparent upon reviewing the following general description and the appended claims.

DESCRIPTION OF THE DRAWINGS

FIG. 2 is a side and partially diagrammatic view of a self-propelled aerating device shown in FIG. 1, except that the device is shown in the transport position;

FIG. 3 is an enlarged perspective view of the control handle of the device shown in the neutral position;

FIG. 4 is a sectional view taken generally along line 4—4 in FIG. 3, except that the control handle has been moved to the intermediate position; and FIG. 5 is a sectional view taken generally along line 4—4 in FIG. 3, except that the control handle has been moved to the drive position.

Figure 1:
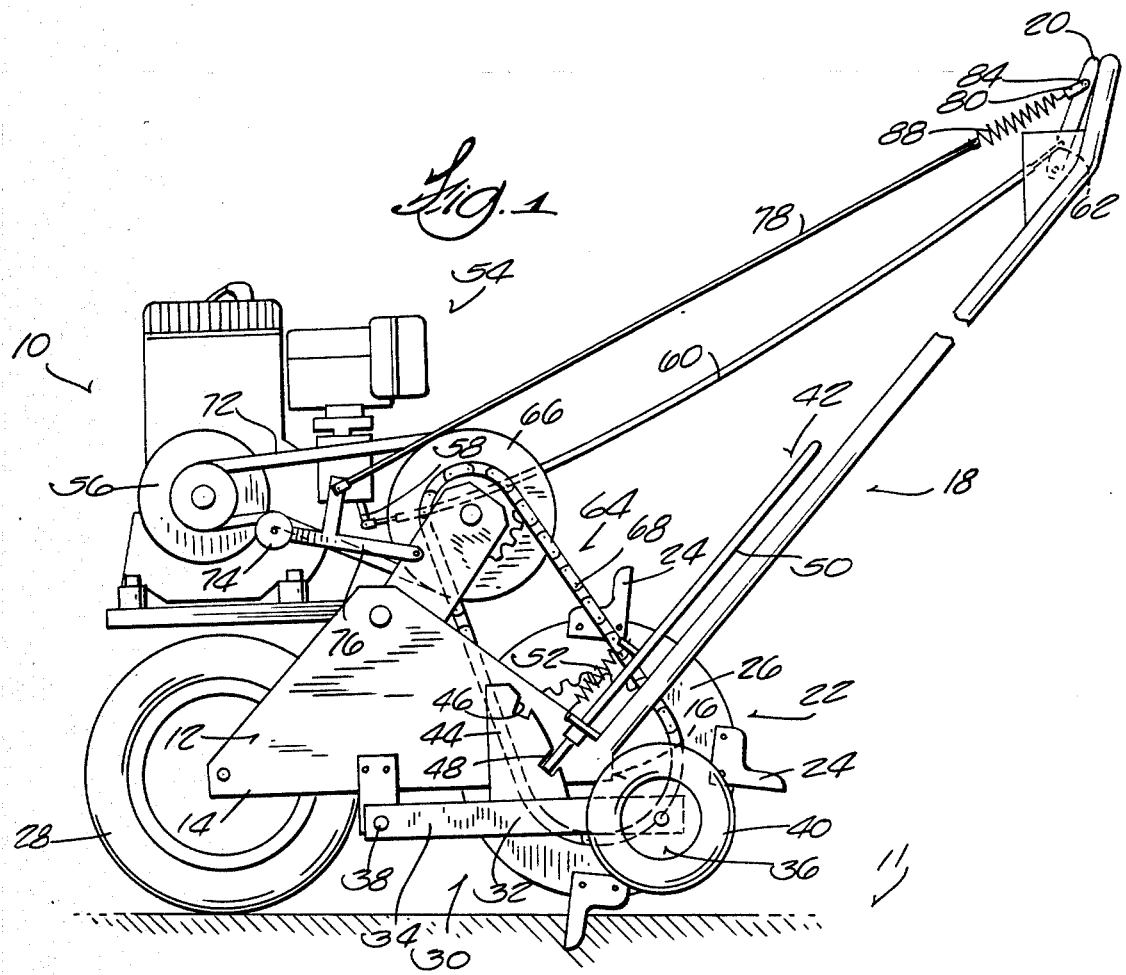
FIG. 1 is a side and partially diagrammatic view of a self-propelled aerating device embodying various of the features of the invention and showing the device in the operational position.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

An aerating device 10 is shown in FIG. 1 which embodies various of the features of the invention. While the invention is applicable for use in aerating devices of various constructions, in the illustrated embodiment, the aerating device 10 includes a chassis 12 adapted for movement over the ground 11 and having a front end portion 14 and a rear end portion 16. A handle 18 is attached to the rear end portion 16 for guiding the movement. A control handle 20 is attached to the handle 18 and is adapted for forward and rearward pivotal movement relative to the handle 18.

Aerating means 22 is mounted for rotation relative to the rear end portion 16. The aerating means 22 includes a plurality of spikes 24, or tines, mounted about a center hub 26. The tines 24 are adapted to penetrate the ground 11 as the aerating means 22 is rotated.

A ballast wheel 28 having weight is mounted for rotation relative to the front end portion 14 and supports the front end portion 14 from the ground 11.

Because of this construction, the chassis 12 is adapted to pivot relative to the aerating means 22 when the handle 18 is moved vertically downwardly, thereby lifting the ballast wheel 28 off the ground 11 to provide a downward thrust force upon the aerating means 22 during operation of the device. The chassis is further adapted to pivot relative to the ballast wheel 28 when the handle 18 is moved vertically upwardly, thereby lifting the aerating means off the ground 11 to facilitate steering or otherwise moving the device 10 when the aerating means 22 is not being used.

In one embodiment of the invention, the device 10 includes rear support means 30 movable between an operational position to control the depth of penetration of the tines 24 into the ground 11 and provide overall lateral stability to the device 10 when the aerating means 22 is in operation, and a transport position in which the rear support means 30 supports the rear end portion 16 and the aerating means 22 from the ground 11 to facilitate movement of the device 10 when the aerating means 22 is not in operation.

The rear support means 30 includes a shaft 38 which is mounted transversely across the underbody of the chassis 12 and is located generally between the front end portion 14 and the rear end portion 16. The shaft 38 is mounted to rotate relative to the chassis 12.

A pair of support frames 32 is provided, each support frame 32 having an inner end 34 and an outer end 36. While FIGS. 1 and 2 show only one support frame 32, it is to be understood that the opposite side of the device 10, which is not illustrated, also includes a support frame corresponding to the support frame shown. The inner ends 34 are attached at opposite ends of the shaft 38 for common rotation therewith, and positioned generally outwardly of the aerating means to provide lateral support. A support wheel 40 is mounted on each outer end 36 for rotation relative to the outer end 36.

In this construction, the support frames 32 are movable between the transport position (shown in FIG. 2) in which the support wheels 40 support the rear end portion 16 and the aerating means 22 from the ground 11; and the operational position (shown in FIG. 1) in which the aerating means 22 supports the rear end portion 16 from the ground 11 thereby permitting the tines 24 to penetrate the ground 11. In the operational position, however, the support wheels 40 limit the penetration of the tines 24 into the ground 11 to a predetermined depth, as well as provide overall lateral stability to the chassis 12 during operation of the aerating means 22.

Locking means 42 is provided so that the operator may selectively lock the rear support means 20 in either the transport or operational position. The locking means 42 includes a locking quadrant 44 attached to at least one of the support frames 32. The locking quadrant 44 has an upper slot 46 and a lower slot 48. The locking means 42 further includes a manually operated latch 50 which is adapted to be slidably received in either slot 46 or 48. A spring 52 biases the latch 50 in a normally locked position, engaging the latch 50 in either slot 46 or 48, and preventing pivotal movement of the support frames 32. When the latch 50 is thus engaged in the upper slot 46, the support frames 32 are securely held in the transport position; when the latch 50 is engaged in the lower slot 48, the support frames 32 are securely held in the operational position.

The machine operator may pivotally change the position of the support frames 32 by sliding the latch 50 out of engagement with its respective slot 46 and 48 and moving the handle 18 either vertically upwardly to move the support frames 32 from the operational position to the transport position, or vertically downwardly to move the support frames 32 from the transport position to the operational position.

The aerating device 10 is self-propelled because a small reciprocating engine 54 is provided having a drive wheel 56 which is drivingly connected with the aerating means 22. The engine 54 includes a throttle 58 which is movable between an idle position (shown in FIG. 2) for driving the engine 54 at idle speed and an advanced position (shown in FIG. 1) for driving the engine 54 at above idle speed. A throttle control cable 60 is operatively connected to the throttle 58 and includes a throttle cable end portion 62 attached to the control handle 20.

Aerator drive means 64 operatively connects the drive wheel 56 with the aerating means 22. The aerator drive means 64 is movable between an engaged position for drivingly connecting the aerating means 22 with the drive wheel 56 and a disengaged position for interrupting the driving connection between the aerating means 22 and the drive wheel 56.

While the aerator drive means 64 can be constructed in various manners, in the illustrated embodiment, the aerator drive means 64 includes a flywheel 66 which is drivingly connected with the aerating means 22 by a drive chain 68. A flexible drive belt 72 is carried by the flywheel 66 and the drive wheel 56. The drive belt 72 has a diameter such that it is normally loosely-carried by the flywheel 66 and the drive wheel 56, so that the rotation of the drive wheel 56 will not be transmitted to the flywheel 66, as is shown in FIG. 2. This corresponds to the disengaged position of the aerator drive means 64.

The drive belt is further carried by a pulley 74 located intermediate the flywheel 66 and the drive wheel 56. The pulley 74 is mounted at the end of a pivotally attached lever arm 76 which is, in turn, operatively connected to an aerator control cable 78 having an aerator cable end portion 80 which is operatively attached to the control handle 20. Thus, as the control handle 20 is moved rearwardly by the operator, the aerator control cable 78 moves the lever arm 76, which causes the pulley 74 to bear against the drive belt 72. The tension in the drive belt 72 between the flywheel 66 and the drive wheel 56 is thereby increased, as is shown in FIG. 1, moving the drive belt 72 from the loosely-carried position to a tightly-carried position, at which time the flywheel 66 and the drive wheel 56 are drivingly connected. This corresponds to the engaged position of the aerator drive means 64.

As can be seen, movement of the control handle 20 between the forward and rearward positions operatively affects the positions of both the throttle 58 and the aerator drive means 64. Referring to FIG. 2, in the forward, or neutral position, the control handle 20 holds the throttle 58 in the idle position while holding the drive belt 72 in the loosely-carried position, during which the aerating means 22 is inoperative. Referring now to FIG. 1, in the rearward, or drive, position, the control handle 20 holds the throttle 58 in the advanced position while holding the drive belt 72 in the tightly-carried position, during which maximum power is transmitted from the engine 54 to the aerating means 22.

To achieve even and smooth operation and to reduce the chance of damaging the aerator drive means 64, it is desirable to further coordinate the respective positions of the throttle 58 and the aerator drive means 64 as the control handle 20 is moved between the forward and rearward positions. Thus, the invention provides control means 82 for moving the aerator drive means 64 from the disengaged position to the engaged position before moving the throttle 58 from the idle position to the advanced position. Likewise, the control means 82 moves the throttle 58 from the advanced position to the idle position before moving the aerator drive means 64 from the engaged position to the disengaged position.

More specifically, the control handle 20 includes an intermediate position between the neutral and the drive positions. In accordance with the invention, as the control handle 20 is moved from the neutral to the intermediate position, the throttle 58 is held in the idle position while the aerator drive means 64 is moved from the disengaged position to the engaged position. As the control handle 20 is thereafter moved from the intermediate position to the drive position, the throttle 58 is moved from the idle position to the advanced position while the aerator drive means 64 continues to be held in the engaged position.

This operational sequence is achieved by providing an upper aperture 84 and a lower aperture 86 in the control handle 20. Referring first to FIG. 3, the upper aperture 84 is adapted to engage the aerator cable end portion 80. The aerator cable end portion 80 further includes tension means 88, such as a spring, to securely hold the aerator cable end portion 80 within the upper aperture 84 regardless of the position of the control handle 20. Therefore, as the control handle 20 is moved between the neutral and intermediate positions, the aerator drive means 64 is immediately moved by the aerator control cable 78 from a disengaged to the engaged position and continues to be held in the engaged position as the control handle 20 is further moved between the intermediate and drive positions.

The lower aperture 86 is adapted to receive the throttle cable end portion 62. As can be seen in FIG. 4, the lower aperture 86 is adapted to slidably engage the throttle cable end portion 62 as the control handle 20 is moved between the neutral and intermediate positions. The throttle 58 is thereby held in the idle position while the aerator drive means 64 is being moved into the engaged position by the upper aperture 84. As can be seen in FIG. 5, the lower aperture 86 is adapted to securely engage the throttle cable end portion 62 and thus move the throttle control cable 60 only when the control handle 20 is moved from the intermediate position to the drive position. The throttle 58 is thus moved by the throttle control cable 60 from the idle position to the advanced position. As previously noted, the aerator drive means 64 is already in the engaged position when this sequence occurs.

The invention further provides override means 90 for reducing the possibility that the throttle 58 will become stuck or frozen in the advanced position while the aerator drive means 64 is moved from the engaged to the disengaged position, thereby resulting in engine "runaway". At the same time, the override means 90 provides a means for quickly disengaging the aerator drive means 64 in the event that the throttle 58 does become frozen in the advanced position.

The override means 90 includes an override bracket 92 in which the lower aperture 86 is located and to which the throttle control cable 60 is operatively connected as before described. The override bracket further includes a tab 94 which abuts the control handle 20, thereby adapting the override bracket 92 for rearward pivotal movement in response to the rearward pivotal movement of the control handle 20. However, the forward pivotal movement of the override bracket is governed by spring means 96 attached to the override bracket, and is controlled by the tab 94 which prevents the forward progress of the springassisted pivotal movement of the override bracket 92 from exceeding the forward progress of the manually controlled pivotal movement of the control handle 20.

In accordance with the invention, as the control handle 20 is pivoted forwardly from the drive position to the neutral position, the spring biased override bracket 92 assists the return of the throttle from the advanced position to the idle position, while the tab 94 assures the desired sequence of operation. However, as is readily apparent, should the throttle control cable 60 freeze while the throttle 58 is in the advanced position in spite of the spring means 96, the control handle 20 operates independently of the override bracket 92, and can be quickly moved from the drive position to the neutral position to disengage the aerator drive means 64.

Various of the features of the invention are set forth in the following claims.

I claim:

1. A self-propelled aerating device including a chassis having a handle, aerating means for penetrating the ground, an engine having an idle speed, a throttle operatively connected with said engine and movable between a normally idle position for operating said engine at said idle speed and an advanced position for operating said engine at above said idle speed, aerator drive means movable between a normally disengaged position for rendering said aerating means inoperative and an engaged position for drivingly connecting said operating means with said engine, and control means for moving said aerator drive means from said disengaged position to said engaged position before moving said throttle from said idle position to said advanced position and for moving said throttle from said advanced position to said idle position before moving said aerator drive means from said engaged position to said disengaged position, said control means including a control handle attached to said handle and movable between a neutral position and a drive position, a throttle control linkage operably connected between said throttle and said control handle for locating said throttle in the idle position when said control handle is in the neutral position and for locating said throttle in the advanced position when said control handle is in the drive position, and a control linkage operatively connected between said aerator drive means and said control handle for locating said aerator drive means in the disengaged position when said control handle is in the neutral position and for locating said aerator drive means in the engaged position when said control handle is in the drive position, and spring means for biasing said throttle control linkage toward said idle position, said control handle including an override bracket operatively connected with said throttle and attached to said spring means for moving said throttle from said idle position to said advanced position in response to movement of said control handle from said neutral to said drive position, and for moving said throttle from said advanced position to said idle position in response to said spring means.

2. A self-propelled aerating device according to claim 1 wherein said override bracket includes tab means for preventing movement of said override bracket in response to said spring means in excess of the movement of said control handle between said drive position and said neutral position.

3. A self-propelled aerating device including a chassis having a handle, aerating means for penetrating the ground, an engine having an idle speed, a throttle operatively connected with said engine and movable between a normally idle position for operating said engine at said idle speed and an advanced position for operating said engine at above said idle speed, aerator drive means movable between a normally disengaged position for rendering said aerating means inoperative and an engaged position for drivingly connecting said operating means with said engine, and control means for moving said aerator drive means from said disengaged position to said engaged position before moving said throttle from said idle position to said advanced position and for moving said throttle from said advanced position to said idle position before moving said aerator drive means from said engaged position to said disengaged position, said control means including a control handle attached to said handle and movable between a neutral position and a drive position, a throttle control linkage operably connected between said throttle and said control handle for locating said throttle in the idle position when said control handle is in the neutral position, for locating said throttle in the advanced position when said control handle is in the drive position, and including means for affording movement of said control handle toward said neutral position independently of said throttle control linkage, said connecting means including an override bracket mounted on said handle, and tab means for preventing movement of said override bracket in the direction toward the position locating said throttle in said idle position independently of movement of said control handle toward said neutral position while permitting movement of said control handle toward said neutral position independently of movement of said override bracket toward the position locating said throttle in said idle position, a control linkage operatively connected between said aerator drive means and said control handle for locating said aerator drive means in the disengaged position when said control handle is in the neutral position and for locating said aerator drive means in the engaged position when said control handle is in the drive position, and spring means for biasing said throttle control linkage toward said idle position.

4. A self-propelled aerating device comprising a chassis having a handle, aerating means for penetrating the ground, an engine having an idle speed and including a drive wheel, a throttle operatively connected with said engine and movable between a normally idle position for operating said engine at said idle speed and an advanced position for operating said engine at above said idle speed, aerator drive means including a flywheel drivingly connected with said aerating means, a flexible drive belt carried by said fylwheel and said drive wheel, said drive belt being adjustable between a loosely-carried position for operatively disengaging said flywheel from said drive wheel and a tightly-carried position for operatively engaging said flywheel with said drive wheel and thus drivingly connecting said aerating means with said engine, belt tightening means for adjusting said flexible drive belt between said loosely-carried position and said tightly-carried position, a throttle control cable operatively connected with said throttle, an aerator control cable operatively connected with said belt tightening means, a control handle attached to said handle and operatively connected with said aerator control cable, said control handle being movable between a neutral position holding said flexible drive belt in said loosely-carried position, and a drive position holding said flexible drive belt in said tightly-carried position, spring means for biasing said control handle toward said idle position, and means connecting said control handle to said throttle control cable for holding said throttle in said idle position when said control handle is in said neutral position, for holding said throttle in said advanced position when said control handle is in said drive position, and for affording movement of said control handle toward said neutral position independently of said throttle control cable, said connecting means including an override bracket mounted on said handle, and tab means for preventing movement of said override bracket in the direction toward the position locating said throttle in said idle position independently of movement of said control handle toward said neutral position while permitting movement of said control handle toward said neutral position independently of movement of said override bracket toward the position locating said throttle in said idle position.

5. A self-propelled aerating device comprising a chassis having a handle, aerating means for penetrating the ground, an engine having an idle speed and including a drive wheel, a throttle operatively connected with said engine and movable between an idle position for operating said engine at said idle speed and an advanced position for operating said engine at above said idle speed, aerator drive means including a flywheel drivingly connected with said aerating means, a flexible drive belt carried by said flywheel and said drive wheel, said drive belt being adjustable between a loosely-carried position for operatively disengaging said flywheel with said drive wheel and a tightly-carried position for operatively engaging said flywheel with said drive wheel and thus drivingly connecting said aerating means with said engine, belt tightening means for adjusting said flexible drive belt between said loosely-carried position and said tightly-carried position, said belt tightening means including a pulley carried by said flexible drive belt intermediate said drive wheel and said flywheel, a lever arm connected to said pulley for moving said pulley against said flexible drive belt to increase the tension thereof, a throttle control cable operatively connected with said throttle, an aerator control cable operatively connected with said lever, a control handle attached to said handle and operatively connected with said control cable and said aerator control cable, said control handle being movable between a neutral position holding said throttle in said idle position and said flexible drive belt in said loosely-carried position, and a drive position holding said throttle in said advanced position and said flexible drive belt in said tightly-carried position, said control handle having an intermediate position between said neutral and said drive positions, said control handle further including an override bracket operatively connected with said throttle control cable, spring means attached to said override bracket, an aerator control aperture adapted to engage said aerator control cable to move said flexible drive belt from said loosely-carried position to said tightly-carried position in response to movement of said control handle from said neutral to said intermediate position, and a throttle control aperture adapted to slidably receive said throttle control cable when said control handle is moved from said neutral to said intermediate position and to engage said throttle control cable to move said throttle from said idle position to said advanced position in response to movement of said control handle from said intermediate to said drive position, said throttle control aperture being located in said override bracket and adapted to move said throttle from said idle position to said advanced position in response to movement of said control handle from said neutral to said drive position and to move said throttle from said advanced position to said idle position in response to said spring means.

6. A self-propelled aerating device according to claim 5 wherein said override bracket includes tab means for preventing movement of said override bracket in response to said spring means in excess of the movement of said control handle between said drive position and said neutral position.

7. A self-propelled aerating device comprising a chassis having a handle, aerating means for penetrating the ground, an engine having an idle speed and including a drive wheel, a throttle operatively connected with said engine and movable between an idle position for operating said engine at said idle speed and an advanced position for operating said engine at above said idle speed, aerator drive means including a flywheel drivingly connected with said aerating means, a flexible drive belt carried by said flywheel and said drive wheel, said drive belt being adjustable between a loosely-carried position for operatively disengaging said flywheel from said drive wheel and a tightly-carried position for operatively engaging said flywheel with said drive wheel and thus drivingly connecting said aerating means with said engine, belt tightening means for adjusting said flexible drive belt between said loosely-carried position and said tightly-carried position, a throttle control cable operatively connected with said throttle, an aerator control cable operatively connected with said belt tightening means, a control handle attached to said handle and operatively connected with said throttle control cable and said aerator control cable, said control handle being movable between a neutral position holding said throttle in said idle position and said flexible drive belt in said loosely-carried position, and a drive position holding said throttle in said advanced position and said flexible drive belt in said tightly-carried position, said control handle having an intermediate position between said neutral and said drive positions, said control handle further including an override bracket operatively connected with said throttle control cable, spring means attached to said override bracket, an aerator control aperture adapted to engage said aerator control cable to move said flexible drive belt from said loosely-carried position in said tightly-carried position in response to movement of said control handle from said neutral to said intermediate position, and a throttle control aperture adapted to slidably receive said throttle control cable when said control handle is moved from said neutral to said intermediate position and to engage said throttle control cable to move said throttle from said idle position to said advanced position in response to movement of said control handle from said intermediate to said drive position, said throttle control aperture being located in said override bracket and adapted to move said throttle from said idle position to said advanced position in response to movement of said control handle from said neutral to said drive position and to move said throttle from said advanced position to said idle position in response to said spring means.

8. A self-propelled aerating device comprising a chassis having a handle, aerating means for penetrating the ground, an engine having an idle speed and including a drive wheel, a throttle operatively connected with said engine and movable between an idle position for operating said engine at idle speed and an advanced position or operating said engine at above idle speed, aerator drive means including a flywheel drivingly connected with said aerating means, a flexible drive belt carried by said flywheel and said drive wheel, said drive belt being adjustable between a loosely-carried position for operatively disengaging said flywheel from said drive wheel and a tightly-carried position for operatively engaging said flywheel with said drive wheel and thus drivingly connecting said aerating means with said engine, belt-tightening means for adjusting said flexible drive belt between said loosely-carried position and said tightly-carried position, a throttle control cable operatively connected with said throttle, an aerator control cable operatively connected with said belt-tightening means, a control handle movable on said handle sequentially between a neutral position, a drive position, and an intermediate position between said neutral and drive position, means connecting said control handle and said aerator control cable for displacing said flexible drive belt from said loosely-carried position to said tightly-carried position in response to movement of said control handle from said neutral position to said intermediate position and for providing lost motion in response to movement of said control handle from said intermediate position to said drive position while permitting retention of said drive belt in said tightly-carried position, an override bracket movably mounted on said handle, spring means urging said override bracket in the direction of movement of said control handle from said drive position to said neutral position, means interconnecting said override bracket and said control handle for positively displacing said override bracket with said control handle in response to movement of said control handle from said neutral position to said drive position, for positively displacing said control handle in the direction of movement from said drive position to said neutral position in response to movement of said override bracket in said direction, and for permitting displacement of said control handle from said drive position to said neutral position independently of said override bracket, and means connecting said override bracket and said throttle control cable for providing lost motion when said override bracket is moved with said control handle from said neutral to said intermediate position so as to permit retention of said throttle in the idle position and for displacing said throttle from said idle position to said advanced position when said override bracket is moved with said control handle from said intermediate to said drive position.

9. A self-propelled aerating device comprising a chassis having a handle, aerating means for penetrating the ground, an engine, a throttle operatively connected with said engine and movable between an idle position for operating said engine at idle speed and an advanced position for operating said engine at above idle speed, drive means for selectively drivingly connecting and disconnecting said engine and said aerating means, a control handle movable on said handle sequentially between a neutral position, a drive position, and an intermediate position between said neutral and drive position, an override bracket movably mounted on said handle, spring means urging said override bracket in the direction of movement of said control handle from said drive position to said neutral position, means interconnecting said override bracket and said control handle for positively displacing said override bracket with said control handle in response to movement of said control handle from said neutral position to said drive position, for positively displacing said control handle in the direction of movement from said drive position to said neutral position in response to movement of said override bracket in said direction, and for permitting displacement of said control handle from said drive position to said neutral position independently of said override bracket, means connecting said control handle and said drive means for drivingly connecting said engine and said aerating means in response to movement of said control handle from said neutral position to said intermediate position and for providing lost motion in response to movement of said control handle from said intermediate position while permitting continued driving connection of said engine and said aerator, and means connecting said override bracket and said throttle for providing lost motion when said override bracket is moved with said control handle from said neutral to said intermediate position so as to permit retention of said throttle in the idle position and for displacing said throttle from said idle position to said advanced position when said override bracket is moved with said control handle from said intermediate to said drive position.

* * * * *